United States Patent [19]

Przybyszewski et al.

[11] 4,402,447
[45] Sep. 6, 1983

[54] JOINING LEAD WIRES TO THIN PLATINUM ALLOY FILMS

[75] Inventors: John S. Przybyszewski, Avon; Richard G. Claing, Manchester, both of Conn.

[73] Assignee: The United States of America as represented by the Administrator of National Aeronautics and Space Administration, Washington, D.C.

[21] Appl. No.: 212,949

[22] Filed: Dec. 4, 1980

[51] Int. Cl.$^3$ ............................................. B23K 28/00
[52] U.S. Cl. .................................... 228/103; 228/193; 228/263.18; 415/118
[58] Field of Search ............. 60/200 R, 723; 415/118; 416/61, 213 R; 228/123, 231, 263 A, 263 G, 193; 29/573, 589

[56] References Cited

U.S. PATENT DOCUMENTS

| | | | |
|---|---|---|---|
| 3,006,067 | 10/1961 | Anderson et al. | 29/589 |
| 3,087,239 | 4/1963 | Clagett et al. | 29/471.1 |
| 3,444,006 | 5/1969 | Duncan et al. | 29/573 |
| 3,568,301 | 3/1971 | Shibata et al. | 29/471.3 |
| 3,763,545 | 10/1973 | Spanjer | 228/103 |
| 4,104,605 | 8/1978 | Boudreaux et al. | 338/2 |

FOREIGN PATENT DOCUMENTS 585936 12/1977 U.S.S.R. .............................. 228/103

OTHER PUBLICATIONS

Thin Film Technology, by Berry, et al., Van Nostrand Reinhold, New York (1968), title page and overlead, xix-xxi, 559-561, 583-595, 602-612, and 630-632, including major parts of chapter 12 relating to Lead Attachment.

Primary Examiner—Gus T. Hampilos
Assistant Examiner—M. Jordan
Attorney, Agent, or Firm—Norman T. Musial; John R. Manning

[57] ABSTRACT

Disclosed is a two-step process of joining a lead wire to a $2 \times 10^{-6}$ m thick platinum alloy film which rests upon an equally thin alumina insulating layer which is adhered to a metal substrate. Typically the platinum alloy film forms part of a thermocouple for measuring the surface temperature of a gas turbine airfoil. In the first step the lead wire is deformed 30-60% at room temperature while the characteristic $10^6$ ohm resistance of the alumina insulating layer is monitored for degradation. In the second step the cold pressed assembly is heated at 865°-1025° C. for 4-75 hr in air. During the heating step any degradation of insulating layer resistance may be reversed, provided the resistance was not decreased below 100 ohm in the cold pressing.

4 Claims, 4 Drawing Figures

JOINING LEAD WIRES TO THIN PLATINUM ALLOY FILMS

The government has rights in this invention pursuant to Contract NAS3-20768 awarded by the National Aeronautics and Space Agency.

BACKGROUND OF THE INVENTION

1. The invention herein relates to methods for joining metals, most particularly to the attachment of lead wires to extremely thin metal films resting on deformable metal substrates.

2. It has long been a problem to accurately measure the surface temperature of certain articles, such as gas turbine airfoils, which are disposed within a stream of luminous flowing gases. Because the high heat flux gas stream is often higher in temperature than the metal can sustain, superalloy airfoils are typically internally cooled with air. Any temperature sensor and its attachment which is placed on the surface of such parts must therefore have an extremely high temperature capability. Common wire thermocouples and mechanical attachments are undesired since they can disrupt the flow of the gas stream and alter the temperature through conduction or changes in gas stream stagnation.

Using various thin film techniques, such as plating or vacuum sputtering, a thermocouple sensor can be formed by depositing layers of suitable metals upon a previously placed electrically insulating film such as a ceramic. However, until the 1970's these techniques were limited to measuring surface temperatures below about 400° C. because there was a difficulty in providing a durable thin film insulating layer. Many ceramic layers which were able to be deposited either degraded and became noninsulating at high temperature; others made of deposited material such as quartz, silica, or alumina were found to be too brittle to withstand the severe thermal strains caused by the difference in coefficients of expansion between themselves and the substrate metal.

In the 1970's, coatings of the alumina-forming MCrAlY type became available. See U.S. Pat. Nos. 3,676,085, 3,754,903, and 3,928,026. It was found that careful heating of articles having such coatings could produce a thin layer of durably adherent alumina upon which thermocouple layers could be placed. Thus, thin film thermocouples of the platinum-platinum 10% rhodium type, useful to at least 900° C., can be formed on MCrAlY coated articles. However, it has been a continuing problem to connect substantially larger size lead wires of similar composition to these thin conductive films. Because of the nature of a gas turbine airfoil and the factors mentioned above which discourage the use of conventional thermocouples, any connection must sustain high temperature and be very compact and strong. These requirements preclude the use of most spring devices or mechanical holders and the like. The obvious choice is for a welding process as is conventional and convenient for most connections of the sort. However, when attempted, the heat and pressure associated with such a process not only disrupts the thin metal film but also penetrates the thin and fragile insulating layer of alumina, thereby shorting out the thermocouple and destroying the desired function. Ultrasonic welding is a conventional means of joining lead wires in the semiconductor industry. However, the metals being joined there are typically soft (such as copper, gold, aluminum, etc.). No ultrasonic bonding of the Pt-Pt 10% Rh was achieved when attempted and the manufacturers of the ultrasonic machines attributed this to the hardness and other characteristics of the materials. Laser welding was evaluated but it was found that all usable welding parameters destroyed the thin insulating film.

Accordingly, there is a need for an improved method for attaching hard-high temperature alloy wires to thin metal films resting upon thin insulating layers.

SUMMARY OF THE INVENTION

An object of the invention is to provide for the secure joining of relatively large lead wires to relatively thin films of platinum alloys without upsetting the dielectric properties of the insulator on which the platinum alloy films are deposited.

According to the invention a platinum base lead wire is bonded to platinum base metal film which rests upon a thin ceramic film by contacting the lead wire with the metal film, applying a pressure sufficient to cause at least 30% deformation of the lead wire at room tempterature, and thereafter heating the lead wire and thin film assembly to at least 865° C. for time sufficient to form a diffusion bond. Most commonly the thin metal film will have been deposited by sputtering under a vacuum; platinum-platinum 10% rhodium thin film thermocouples are readily formed in this manner. It is preferred that the bonding of a lead wire be undertaken as soon as feasible subsequent to the sputtering process; too long a wait or undue exposure of the deposited metal film to an elevated temperature environment will cause the formation of a surface layer which prevents bonding.

The amount of deformation which is required must be that which is sufficient to both create a joint of adequate surface area and strength and sufficient to disrupt such surface films as may be present on the lead wire. But, too great a force applied to the thin film will deform and fracture the thin insulating ceramic film; then the film will be electrically connected to the substrate and its functioning will be disrupted. Therefore, it is preferred that the resistance of the ceramic film is continuously monitored during the deformation step, such as by applying a voltage between the metal film and the substrate and observing any change in current. The heating step is accomplished subsequent to the pressing step, preferrably while the lead wire and film-bearing substrate are still contained in a clamp type fixture used in the initial deformation step. Heating for 5 hr is generally sufficient, but longer times are used when a decrease in resistance occurs during the deformation step. Typically the resistance is of the order of $10^6$ ohm but in some instances, this will decrease during deformation due to damage to the insulating film. Heating at times of up to 75 hr is found to restore the insulating film if the resistance does not decrease below about 100 ohm.

The invention provides a method of reliably obtaining strong conductive connections to thin film thermocouples and is accomplished with relatively simple fixturing and equipment. With the resistance monitoring feature, it is apparent during the initial deformation whether the article so produced will be of satisfactory quality.

The foregoing and other objects, features and advantages of the present invention will become more apparent from the following description of preferred embodiments and accompanying drawings.

DESCRIPTION OF PREFERRED EMBODIMENT

The invention is described in terms of the application of lead wires to thin films of platinum and platinum 10% rhodium (Pt-Pt10Rh) metal, where the metal films overlap at a point to form a thermocouple junction. However, it will be seen that the invention is equally applicable to other alloys and applications where high-temperature hard metals are being utilized.

Figure 1:
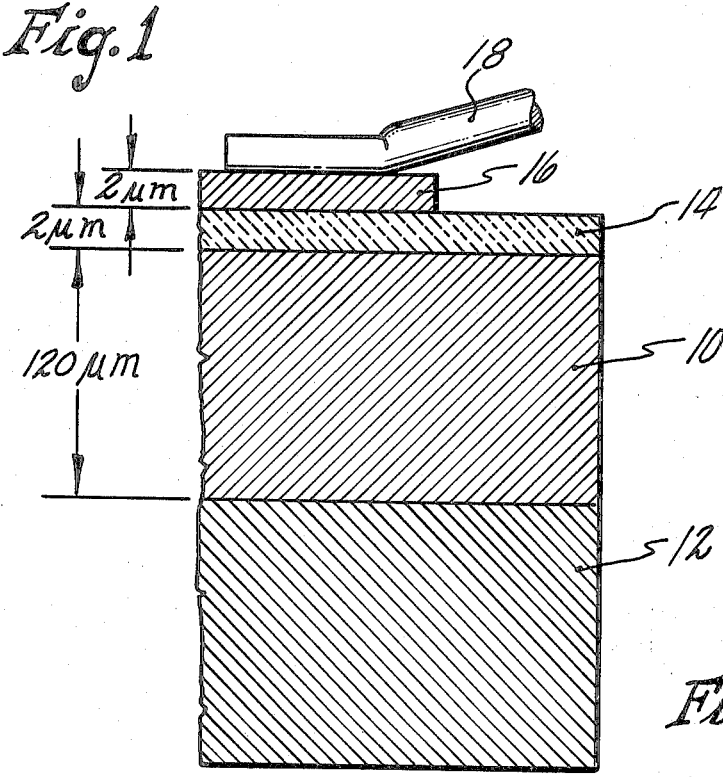
FIG. 1 shows in cross section thin films on a MCrAlY coated substrate, with a lead wire attached to the uppermost metal film.
Figure 4:
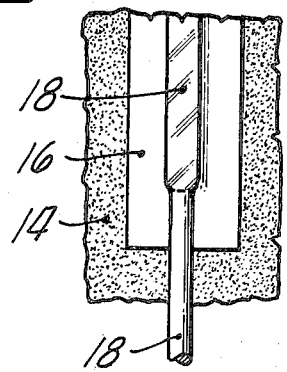
FIG. 4 is a top view of the assembly of FIG. 1.

A superalloy substrate, such as the alloy MAR M-200+Hf (by weight 9Cr, 10Co, 4.1Ti, 3.5Al, 1.9Mo, 0.12C, 3.8W, 3.9Ta, 0.015B, 0.07Zr, 1.15Hf, Bal Ni) is provided with a CoCrAlY or NiCrAlY coating, or other MCrAlY variations thereof, according to the teachings of the patents mentioned in the Background. As shown in cross section in FIG. 1, the coating 10 will be a layer typically of about $120 \times 10^{-6}$ m thick on the substrate 12. The coating is usually shot peened to increase its density; polished to a $10 \times 10^{-6}$ m nominal arithmetic average finish; very lightly grit blasted; heated at 1075° C. in dry hydrogen at a pressure of 100 kPa for about 4 hr; cooled; and reheated to about 1025° C. for 50-150 hr in air. These steps will produce an adherent alumina insulating film 14 of about $2 \times 10^{-6}$ m thick. A good film so produced will have a resistance of $10^{-6}$ ohm or greater. The thickness of the alumina layer and its resistance will vary according to the multiple material and processing parameters. Because of possible metallurgical effects on the substrate, it is desirable that the initial heating time be held to about 50 hours; this will sometimes produce a film with a resistance only somewhat greater than 100 ohm. However, subsequent heating steps described below will later increase the thickness and the resistance of the insulating film in the final article, ready for use. Next, using high energy radio frequency diode sputtering techniques, strip layers of Pt-Pt10Rh are deposited to $2 \times 10^{-6}$ m thickness. Generally, the strips are one millimeter wide and are separated except at one point of intersection where the temperature is to be monitored. One metal film 16 is shown upon the insulating film 14 in FIG. 1 and FIG. 4.

Figure 3:
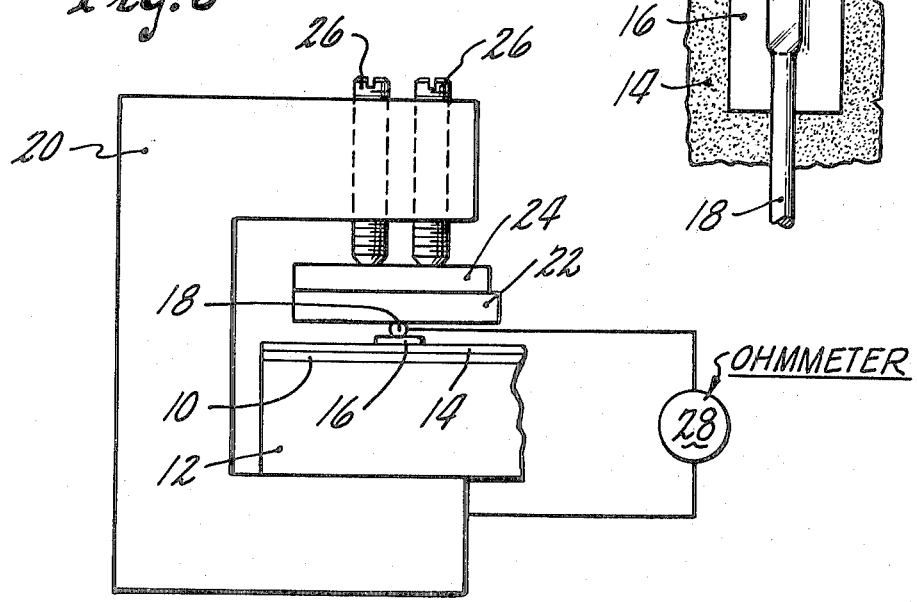
FIG. 3 shows a fixture used for bonding.
Figure 2:
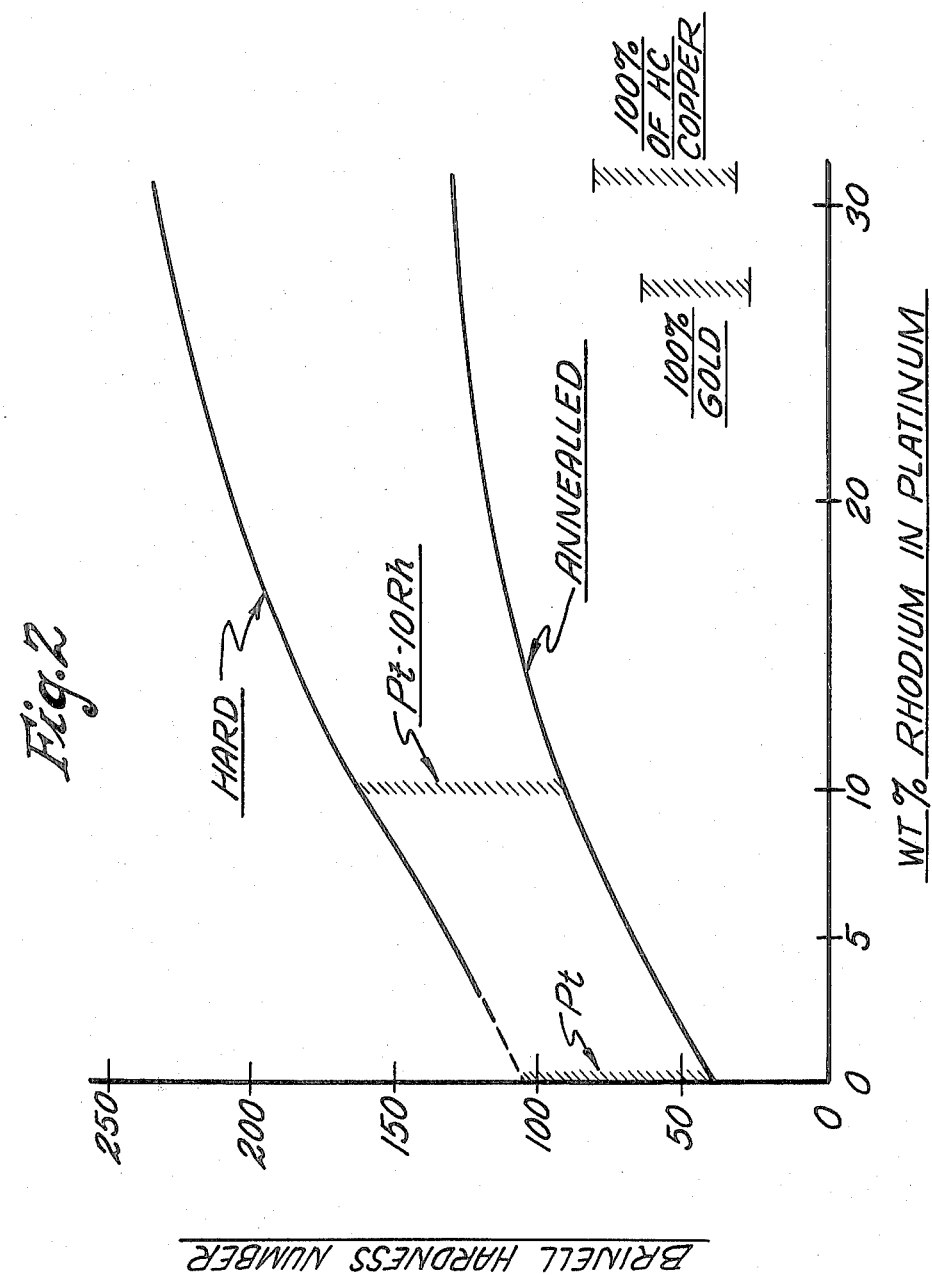
FIG. 2 shows the hardness of platinum alloy as a function of rhodium weight percent and temper.

Next, lead wires of Pt-Pt10Rh are provided. The process for bonding the platinum is substantially the same as that used for the Pt-10Rh. However, since Rh tends to make Pt harder, as shown by FIG. 2, it will be focused on herein. The hardness of the platinum alloy wire will vary according to the composition and heat treatment condition. As shown by FIG. 2, there is substantial range in hardness; obviously, an annealed wire is preferred for workability. But regardless of condition, a PtRh wire will be substantially harder than the relatively soft low temperature metals with which most of the prior art is concerned. The wire 18 is placed in intimate contact with solvent-cleaned film strip, typically in alignment with the principal axis of the strip. The assembly is then inserted in an AISI 304 stainless steel "C" shaped fixture body 20 as shown in FIG. 3. An alumina ceramic platen 22 which has both strength and chemical inertness with respect to the Pt-10Rh lead wire is contacted with the lead wire. Force is applied by means of screws 26. An AISI 304 stainless steel spacer 24 distributes the screw applied force to the platen. A load cell may be substituted for the spacer or placed between the screws and the platen. For a Pt-10Rh wire of about 0.075 mm diameter, it is found that a force 530N, or a pressure of about 350 MPa on the wire deforms the wire by 50%. The deformation of the wire is measured by the change in dimension normal to the film surface. Typically, about 50% deformation is preferred. Lesser amounts of deformation are possible, to as low as about 20-30%; higher amounts of deformation are also possible, with the upper limit being set by the amount of force which is increasingly applied to the wire for increasing amounts of deformation. When too much force is applied the insulating ceramic film will be fractured; and while the lead wire may be adequately bonded, the metal film will no longer be electrically insulated from the substrate and the whole device will no longer be useful.

Table 1 sets forth experimental results when different amounts of deformation were applied to the lead wire, indicating a usable range of amount 30-60% deformation and a preferred range of about 50%.

TABLE 1

Effects of Lead Wire Deformation

| Specimen No. | Deformation (%) | Resistance (ohm) | Comment |
| --- | --- | --- | --- |
| A | 10 | $2 \times 10^7$ | Inadequate bonding |
| B | 30 | $2 \times 10^7$ | Satisfactory bonding |
| C | 50 | $2 \times 10^7$ | Satisfactory bonding |
| D | 70 | 100 | Partial failure insulation |
| E | 70 | 0 | Total failure of insulation |

To detect failure of the insulating layer 14, the resistance of the alumina layer is monitored, as by a 5 v potential applied across the Pt-10Rh film and the substrate by an ohmmeter 28. In any given set-up there is a clamping screw force which if exceeded will result in deformation of the MCrAlY coating due to the force transmitted through the Pt-10%Rh and alumina layers. When this occurs, the relatively brittle alumina layer will be fractured and a conductive path will be created between the Pt 10Rh film and the substrate. The resistance measured by the meter will change from the $10^6$ ohm range to lower levels, and to zero as force is continuously increased. In a series of experiments, this upper limit is found for the typical film bearing substrate part and thereafter it is avoided by limiting the amount of permissible force which is applied by the screws. For the MAR M-200 substrate and MCrAlY coating, it was determined that a lead wire deformation of 50% was easily sufficient to obtain good bonding, but was below that level which would cause cracking of the alumina film in most specimens. Of course, there is a variability among the different specimens and it is for this reason that the resistance is monitored in the routine production of parts once the parameters have been generally ascertained.

During the application of force through action of the clamp screws, the resistance meter is continuously monitored. If decrease in resistance is noted to the range of $5-10 \times 10^5$ ohm, the application of pressure is immediately ceased. Whether the workpiece will be usable is a question of the amount of deformation and how much the resistance has decreased. If the resistance has dropped below 100 ohm, then the specimen must be discarded. However, if the resistance has not decreased below this level it is possible in a subsequent air heating operation at about 975°–1025° C. to restore the resistance of the alumina film to $10^6$ ohm. It is believed that if the cracking is not of undue severity, reheating causes reformation and healing of the film through growth of new alumina from the MCrAlY layer.

After the required deformation is achieved, the entire clamping fixture with specimen and lead wire firmly held therein is transferred to a furnace where the assembly is heated in air to a temperature of 865°–1025° C. or higher for 4–12 hr. The temperature of processing is critical since it has been found that temperatures lower than 865° C. will not result in bonding, regardless of the amount of deformation which is applied in the first step. The data in Table 2 shows this; bond quality is measured qualitatively by pulling on the lead wire and noting failure force and location. Good and fair bonds are those which fail in the joint for a substantial stress compared to the Pt-10Rh/alumina bond strength, or fail elsewhere than in the joint. When the fixture body is made from AISI 304 stainless steel, the maximum heat treatment temperature is practically limited to 865° C. by oxidation. However, other suitable fixture materials may be used to permit higher temperatures. For the MCrAlY and MAR M-200 workpiece this would permit temperatures up to about 1050° C., but as mentioned, temperatures at this range are desirably avoided for metallurgical reasons, if possible. It is speculated that the reason the minimum 865° C. temperature must be achieved resides in the dynamics of the $Rh_2O_3$ oxide which forms on the rhodium-bearing alloys. According to the handbook data, the rate of formation of this gray to black oxide in air is rapid at temperatures in the range 600° C. to 800° C., but decreases at higher temperatures and in fact decreases to zero at 900° C., and at temperatures above 900° C. the oxide decomposes and bright metallic rhodium is regained. The formation of a contaminating layer of $Rh_2O_3$ is avoided by performing the bonding at a temperature of 865° C. or higher. An alternative procedure would be to perform the bonding in an inert gas or vacuum environment. The preferred procedure eliminates the need for special furnace equipment and reforms and heals any alumina film damage.

TABLE 2

Effect of Bonding Temperature on Pt-10 Rh in Air

| Run | Temperature - °C. | Time - Hr | Bond Quality |
| --- | --- | --- | --- |
| 1 | 700 | 6 | poor |
| 2 | 700 | 24 | poor |
| 3 | 865 | 6 | good |
| 4 | 865 | 4 | good |
| 5 | 865 | 2 | fair |

For the preferred temperature of 865° C. it is necessary to hold the assembly at temperature for at least 4 hours to obtain a good bond: greater times including those longer than 12 hours or more are useful and permissable. Of course, higher temperatures tend to reduce the time required. The minimum time required in a specimen which has not been damaged during pressing is that which experiments show produces a bond of adequate strength, i.e., 4 hr. For specimens which have been damaged the minimum time may be about the same, although in prudence it is desirable to spend additional time up to 75 hr at temperature to enhance the repair of the alumina film. Of course the insulation resistance may be measured on cooling after a first time and then additional heating undertaken if necessary. The bonding is done in air purposefully, since exposure to oxygen causes regeneration and buttressing of the alumina film. Nonetheless, the bonding step can be accomplished in a vacuum or inert atmosphere where restoration of insulating film is not required.

The thermal expansion of the fixture, compared to the elements captured therein during heating, must be kept within consideration. For the apparatus just described, there is a slightly greater thermal expansion for the AISI 304 fixture than for the substrate and platen contained therein. However, as the thickness of the platen and substrate in experiments were characteristically small, e.g., about 3 mm overall, the small difference in dimension, or pulling away of the screw clamps from the lead wire and substrate, appears to have been counteracted by the residual elastic force in the clamp. From this it is speculated that relatively little applied force is necessary during the heating step.

The invention will be usable for other Pt alloys, especially those with other Rh contents, and of course including pure Pt. It also will be usable with other coatings than MCrAlY, provided a ceramic layer is formed which is adequately resistive and insulating at the bonding temperature. And, while it is generally not desirable in thermocouples, the invention will also be useful for joining lead wires and films of dissimilar composition.

Although this invention has been shown and described with respect to a preferred embodiment, it will be understood by those skilled in the art that various changes in form and detail thereof may be made without departing from the spirit and scope of the claimed invention.

We claim:

1. The method of bonding a platinum base metal lead wire to a thin base metal film lying on a thin ceramic insulating film which is adhered to a metal substrate which comprises
    (a) contacting the lead wire with the thin metal film
    (b) applying pressure with a platen to the wire in a direction normal to the film surface, the pressure being sufficient to cause at least 30% deformation of the lead wire, but insufficient to decrease the insulating properties of the insulating film below about 100 ohm, to cause intimate contact of the lead wire with the thin metal film;
    (c) heating of the platen fixture, lead wire, and substrate to at least 865° C. for 4 hr or more to form a diffusion bond between the lead wire and thin metal film.

2. The method of claim 1 which further comprises monitoring the resistance of the insulating film during step(b) by applying a voltage between the thin metal film and the substrate and observing the current.

3. The method of claim 1 wherein the thin platinum base metal film has been applied by sputtering and which further comprises commencing step(c) at a time prior to the formation of an appreciable contamination layer on the metal film.

4. The method of claim 2 wherein insulating film has an initial resistance of about $10^6$ ohm which is decreased to less than $10^5$ ohm during step(b) and which further comprises extending the heating time in step(c) to a period of up to 75 hr in air to restore a portion of the resistance.

* * * * *